US012673855B2

(12) United States Patent
Kung

(10) Patent No.: US 12,673,855 B2
(45) Date of Patent: Jul. 7, 2026

(54) PNEUMATIC LIFTING DEVICE

(71) Applicant: Leeroy Eddyston Brown, Birmingham (GB)

(72) Inventor: Chi Hung Kung, Kowloon (CN)

(73) Assignee: Leeroy Eddyston Brown (GB)

( * ) Notice: Subject to any disclaimer, the term of this patent is extended or adjusted under 35 U.S.C. 154(b) by 502 days.

(21) Appl. No.: 18/043,735

(22) PCT Filed: Sep. 1, 2021

(86) PCT No.: PCT/CN2021/116078
§ 371 (c)(1),
(2) Date: Mar. 2, 2023

(87) PCT Pub. No.: WO2022/048575
PCT Pub. Date: Mar. 10, 2022

(65) Prior Publication Data

US 2023/0348243 A1 Nov. 2, 2023

(30) Foreign Application Priority Data

Sep. 2, 2020 (HK) ........................... 32020015306.4

(51) Int. Cl.
*B66F 3/24* (2006.01)
*B66F 3/28* (2006.01)
*B66F 3/38* (2006.01)
*B66F 3/42* (2006.01)

(52) U.S. Cl.
CPC ................ *B66F 3/247* (2013.01); *B66F 3/28* (2013.01); *B66F 3/38* (2013.01); *B66F 3/42* (2013.01)

(58) Field of Classification Search
CPC .... B66F 3/247; B66F 3/38; B66F 3/42; B66F 3/28
See application file for complete search history.

(56) References Cited

U.S. PATENT DOCUMENTS 3,765,650 A * 10/1973 Eisenhauer ............... B66F 3/38 254/133 R
4,523,743 A * 6/1985 Wang ........................ B66F 3/24 254/93 H
2020/0087125 A1 3/2020 Coccaro

FOREIGN PATENT DOCUMENTS

| | | | | |
|---|---|---|---|---|
| CN | 1597494 | A | * | 3/2005 |
| CN | 201999683 | U | | 10/2011 |
| CN | 107879275 | A | | 4/2018 |
| CN | 109650278 | A | | 4/2019 |
| WO | WO 2009026649 | | | 3/2009 |

* cited by examiner

*Primary Examiner* — Seahee Hong

(74) *Attorney, Agent, or Firm* — LaMorte & Associates, P.C.

(57) ABSTRACT

A pneumatic lifting device (1) comprises a pneumatic cylinder (2), and a pneumatic pump (3) for providing pressurized air to the pneumatic cylinder (2). There is a support (4) for supporting an object to be lifted, the support (4) can move between a raised position and a lowered position by the pneumatic cylinder (2). There is also a nozzle (5) for delivering pressurized air from the pneumatic pump (3). These features result in a pneumatic lifting device portable and versatile, as well as being well-suited for convenient storage in these vehicles.

15 Claims, 15 Drawing Sheets

PNEUMATIC LIFTING DEVICE

TECHNICAL FIELD

The invention relates to pneumatic lifting devices. The invention particularly relates to pneumatic lifting devices for lifting vehicles. The invention has been described in the form of a pneumatic jack for use with automobiles to facilitate the changing of wheels or access to the underside of the automobiles, but the invention is not limited to these particular applications.

BACKGROUND ART

Prior lifting devices include those based on mechanical, hydraulic, and pneumatic mechanisms. Lifting devices in the form of jacks for lifting vehicles such as passenger cars need to be compact, portable, and versatile. They need to be compact so that they can be stored in a vehicle, usually in the trunk, without taking up too much space. They need to be portable and versatile so that a wide range of users can carry, move, and operate the devices, usually in less than ideal locations such as by the roadside or wherever a vehicle breaks down.

Many prior jacks are mechanical using mechanisms such as levers and screws. These are simple, reliable, and can be compact and portable. However, these mechanical jacks require a level of physical strength and effort by a user. As such, they may not be convenient or practical.

Hydraulic and pneumatic jacks are more complex, bulkier, and heavier. They also usually require a power source. These jacks are also typically more expensive, especially in relation to their limited functionality, namely, as a device that simply lifts a vehicle. Hydraulic and pneumatic jacks may also be less reliable given that they comprise components that may breakdown more readily than purely mechanical jacks. Furthermore, pneumatic mechanisms are not used as often as hydraulic mechanisms in view of the greater pressure produced by hydraulic mechanisms.

It is an object of the present invention to overcome or ameliorate at least one of the disadvantages of the prior art, or to provide a useful alternative.

SUMMARY OF INVENTION

Technical Problem

Solution to Problem

Technical Solution

Embodiments of the present invention provide a pneumatic lifting device comprising:

- a pneumatic cylinder;
- a pneumatic pump for providing pressurized air to the pneumatic cylinder;
- a support for supporting an object to be lifted, the support movable between a raised position and a lowered position by the pneumatic cylinder; and
- a nozzle for delivering pressurized air from the pneumatic pump.

In one embodiment, the pneumatic lifting device comprises a switch for switching the pneumatic pump between delivering air to the pneumatic cylinder to move the support and delivering air through the nozzle.

In one embodiment, the pneumatic lifting device comprises a switch for operating the pneumatic pump to deliver air through the nozzle whilst delivering air to the pneumatic cylinder, or for operating the pneumatic pump to deliver air to the pneumatic cylinder whilst delivering air through the nozzle.

In one embodiment, the pneumatic lifting device comprises a switch for operating the pneumatic pump to deliver air through the nozzle whilst maintaining the support at substantially the same position.

In one embodiment, the pneumatic lifting device comprises a switch to release pressurized air from the pneumatic cylinder to lower the support.

In one embodiment, the support is hingeable about a first horizontal axis to allow the support to tilt about the first horizontal axis to compensate for tilting of the object being lifted. In one embodiment, the support is hingeable about a second horizontal axis to allow the support to tilt about the second horizontal axis to compensate for tilting of the object being lifted.

In one embodiment, the pneumatic pump is operable with a 12 V power supply.

In one embodiment, the pneumatic lifting device has a minimum height of 140 mm.

In one embodiment, the pneumatic pump delivers pressurized air up to and including 100 psi.

In one embodiment, the pneumatic cylinder has an operating surface against which the pressurized air applies force to move the support to the raised position. In one embodiment, the operating surface has a diameter between about 60 mm and about 200 mm. In one embodiment, the operating surface has a diameter between about 98 mm and about 156 mm. In one embodiment, the operating surface has a diameter of about 98 mm. In one embodiment, the operating surface has an area between about 28 $cm^2$ and about 315 $cm^2$. In one embodiment, the operating surface has an area between about 75 $cm^2$ and about 192 $cm^2$. In one embodiment, the operating surface has an area of about 75 $cm^2$.

Other features and embodiments of the present invention can be found in the appended claims.

Throughout this specification, including the claims, the words “comprise”, “comprising”, and other like terms are to be construed in an inclusive sense, that is, in the sense of “including, but not limited to”, and not in an exclusive or exhaustive sense, unless explicitly stated otherwise or the context clearly requires otherwise.

Advantageous Effects of Invention

BRIEF DESCRIPTION OF DRAWINGS

Description of Drawings

Figure 1:
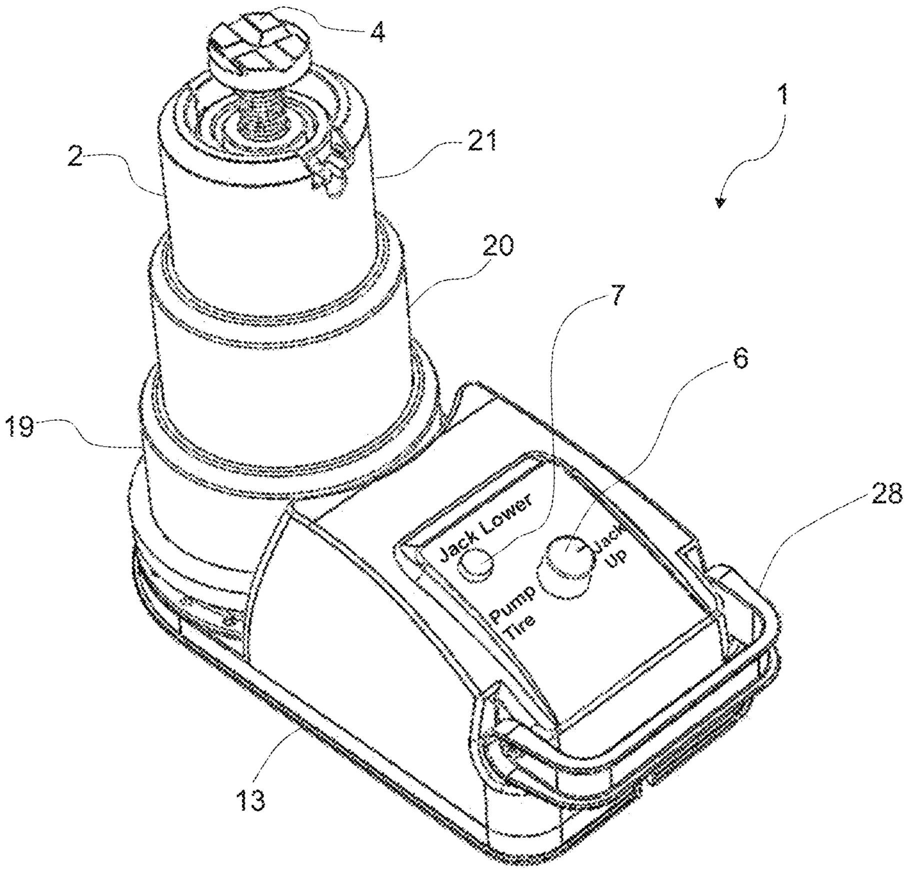
Figure 2:
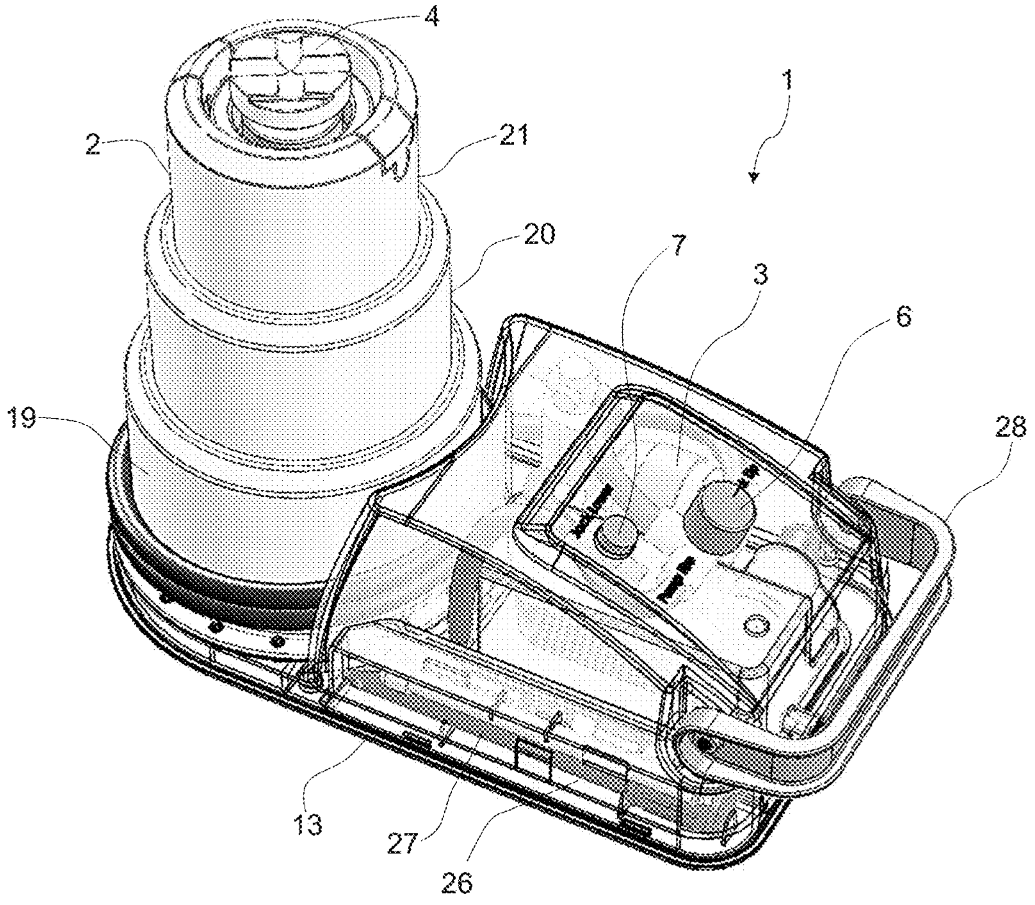
Figure 3:
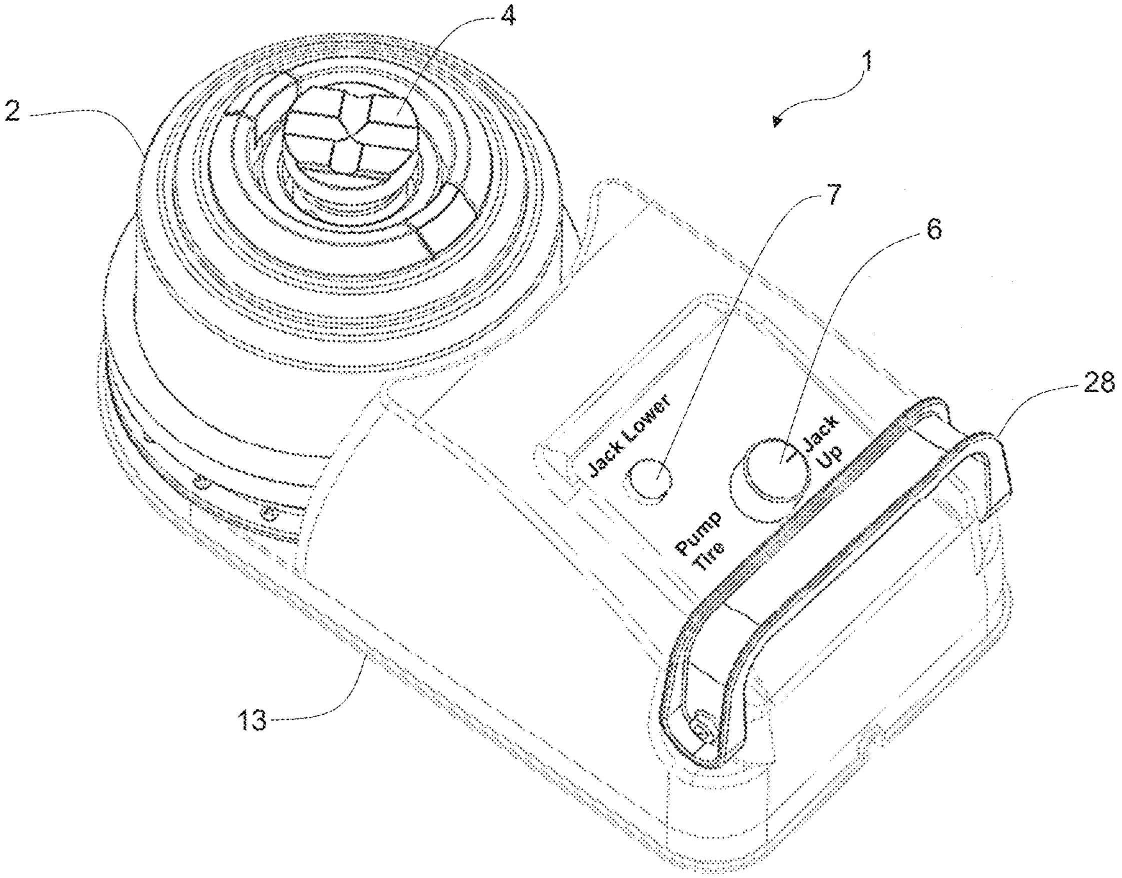
Figure 4:
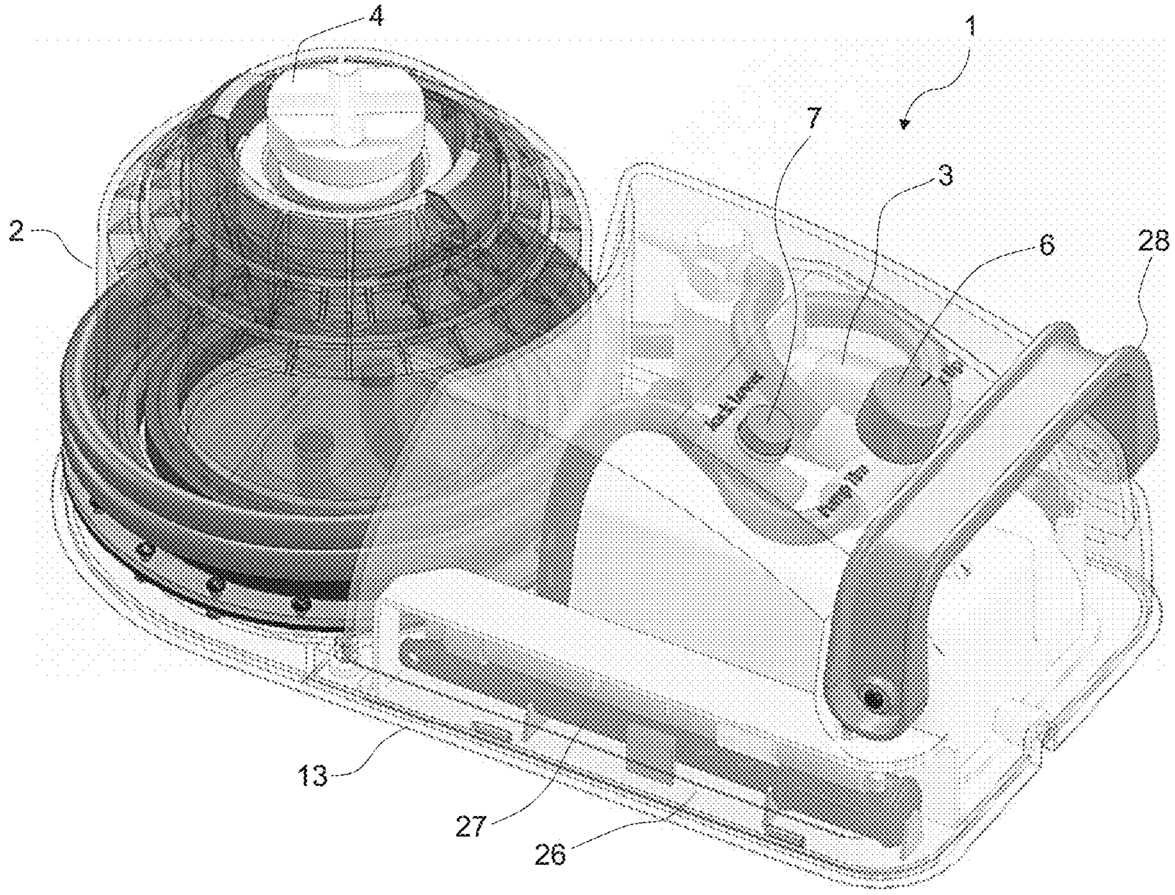
Figure 5:
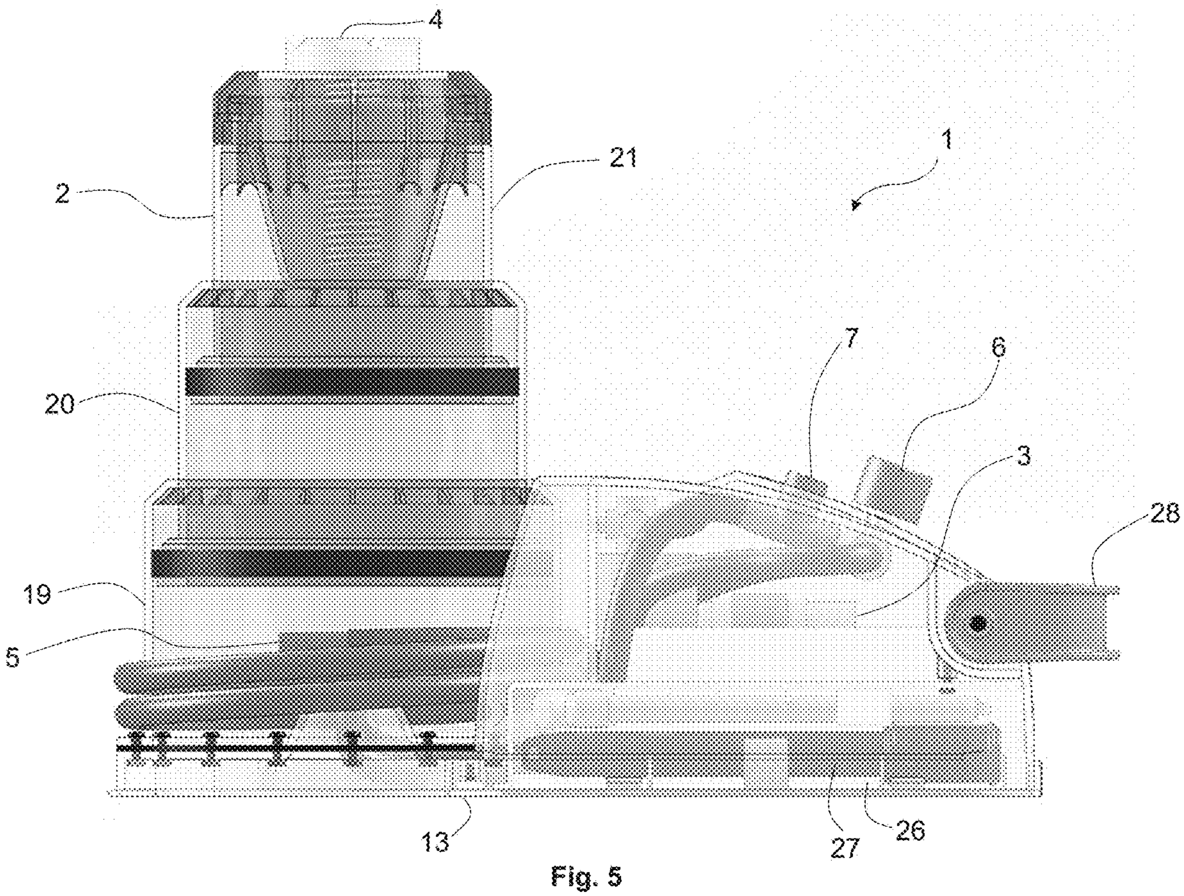
Figure 6:
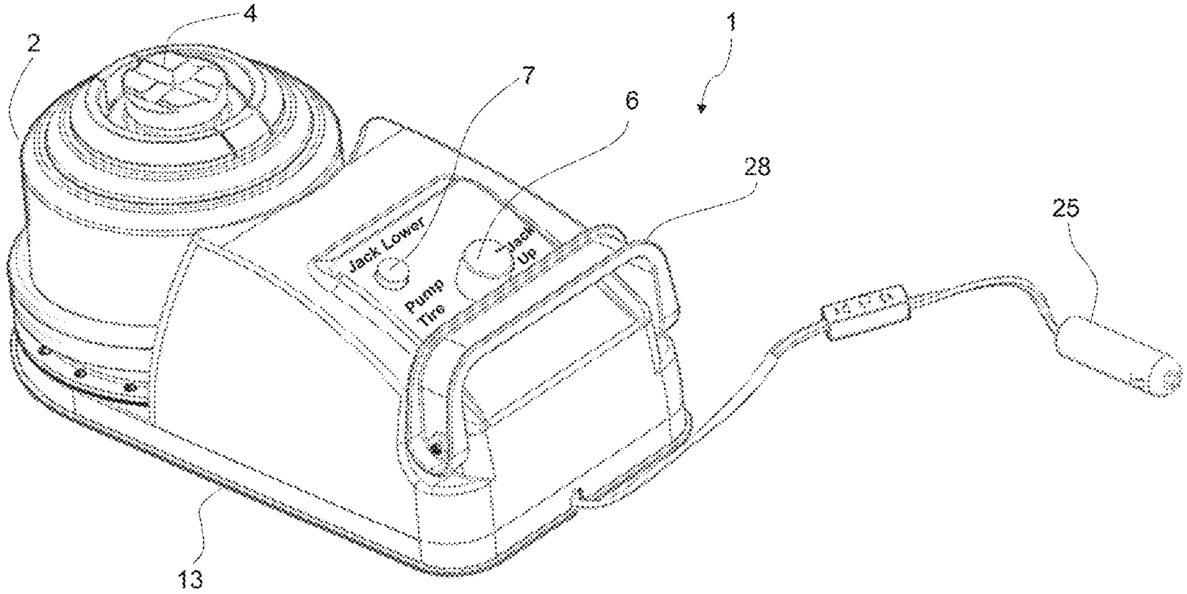
Figure 7:
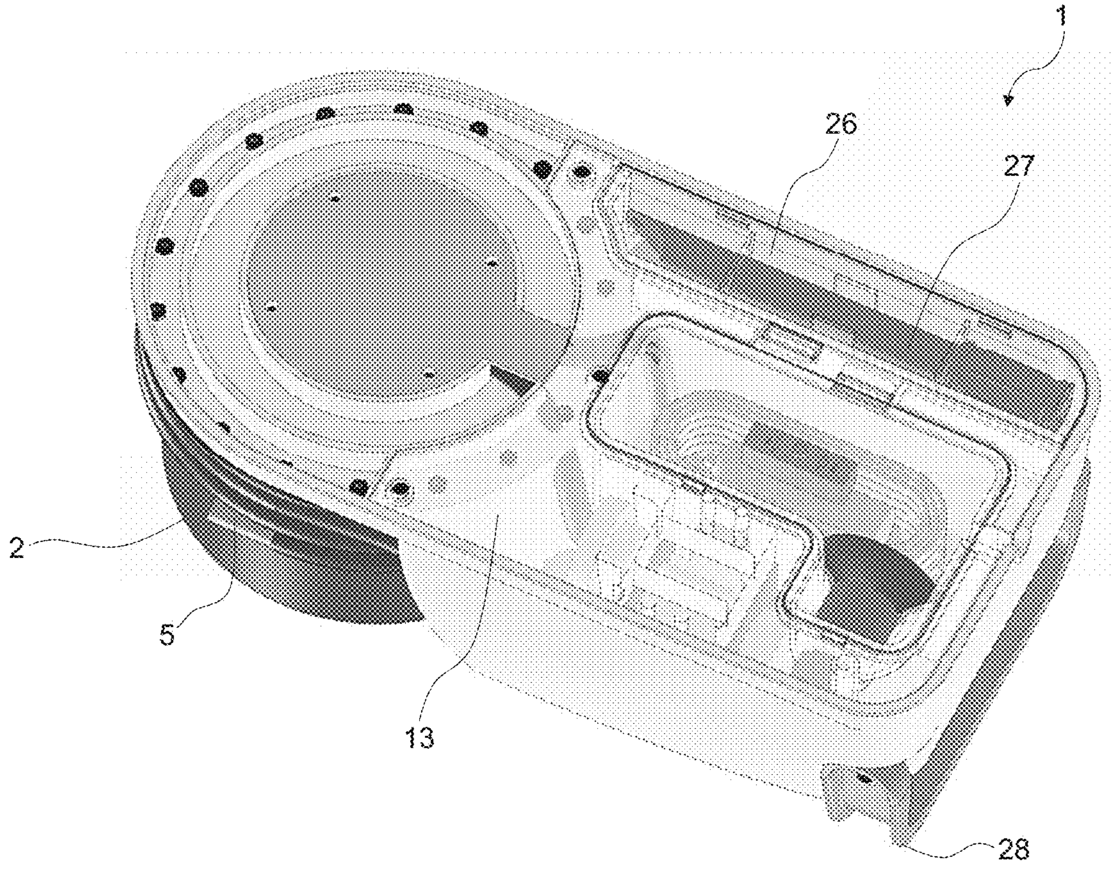
Figure 8:
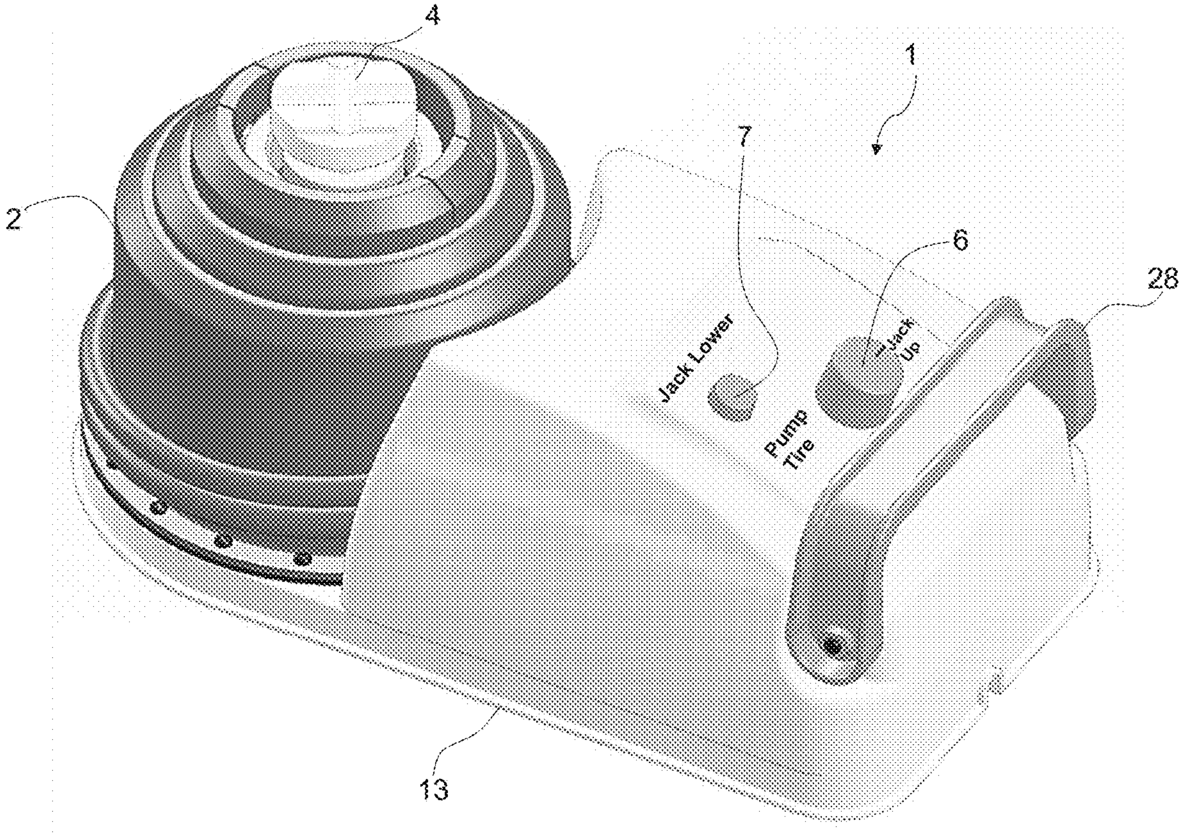
Figure 9:
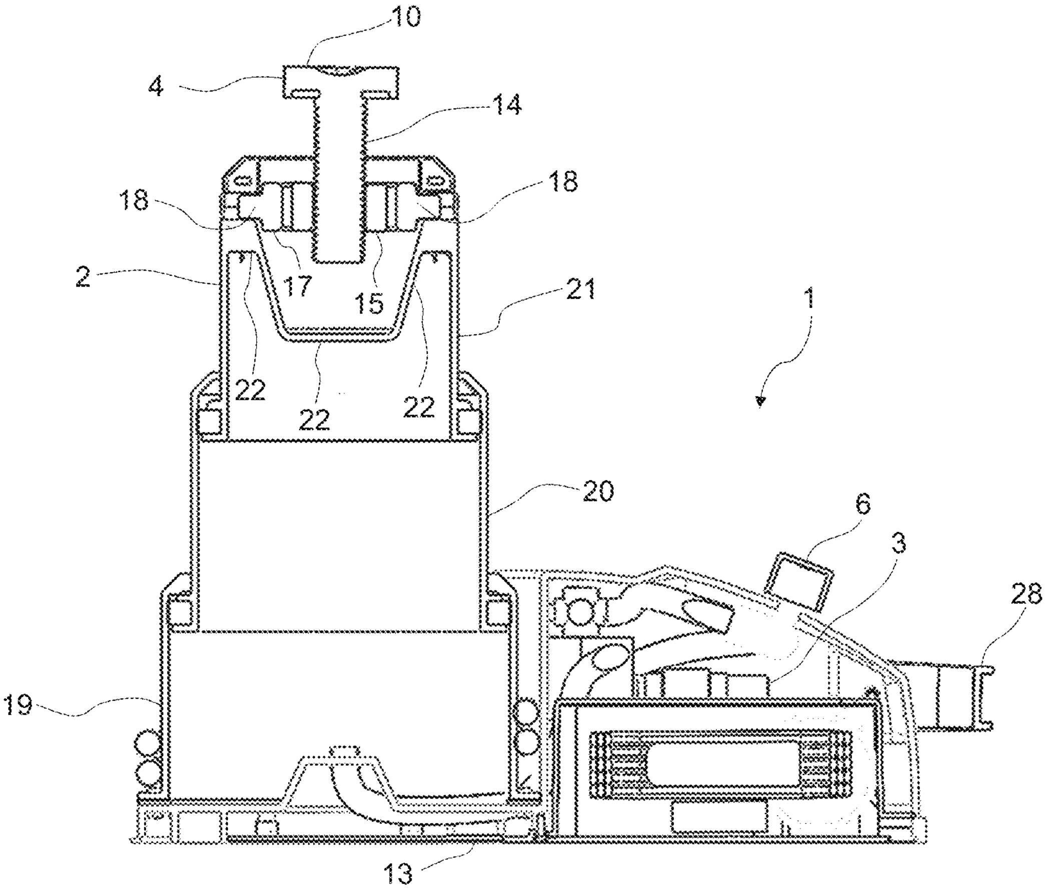
Figure 10:
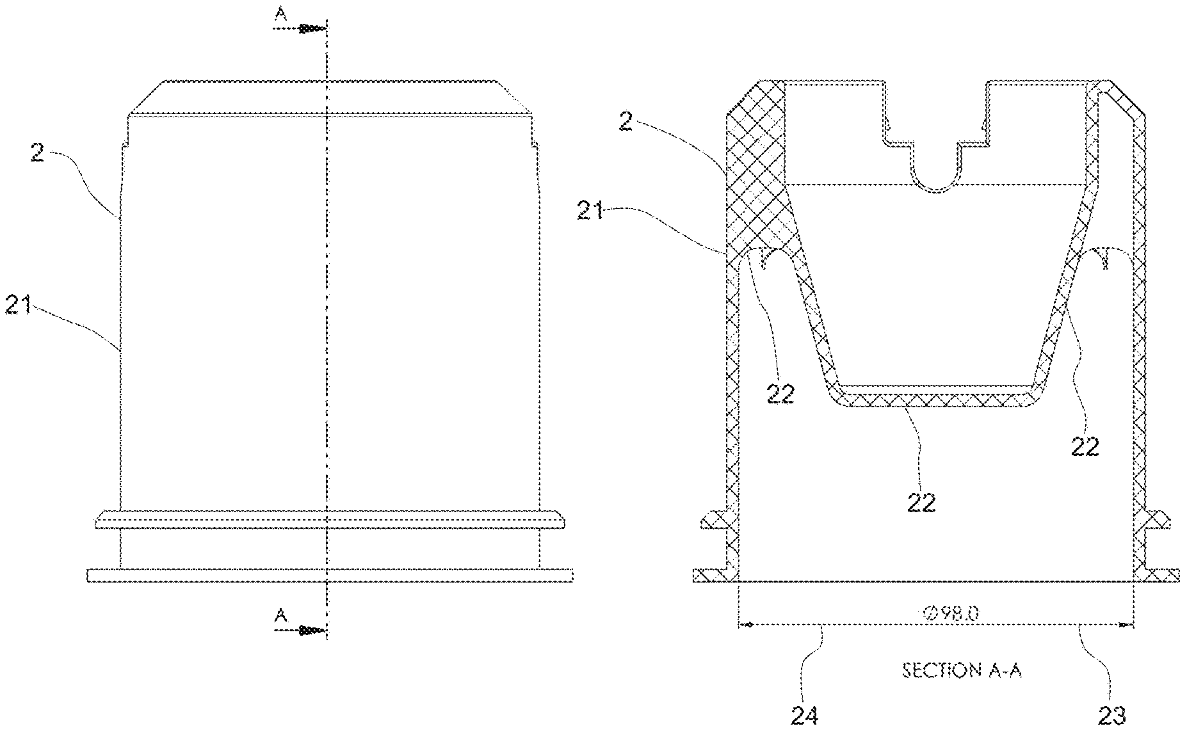
Figure 11:
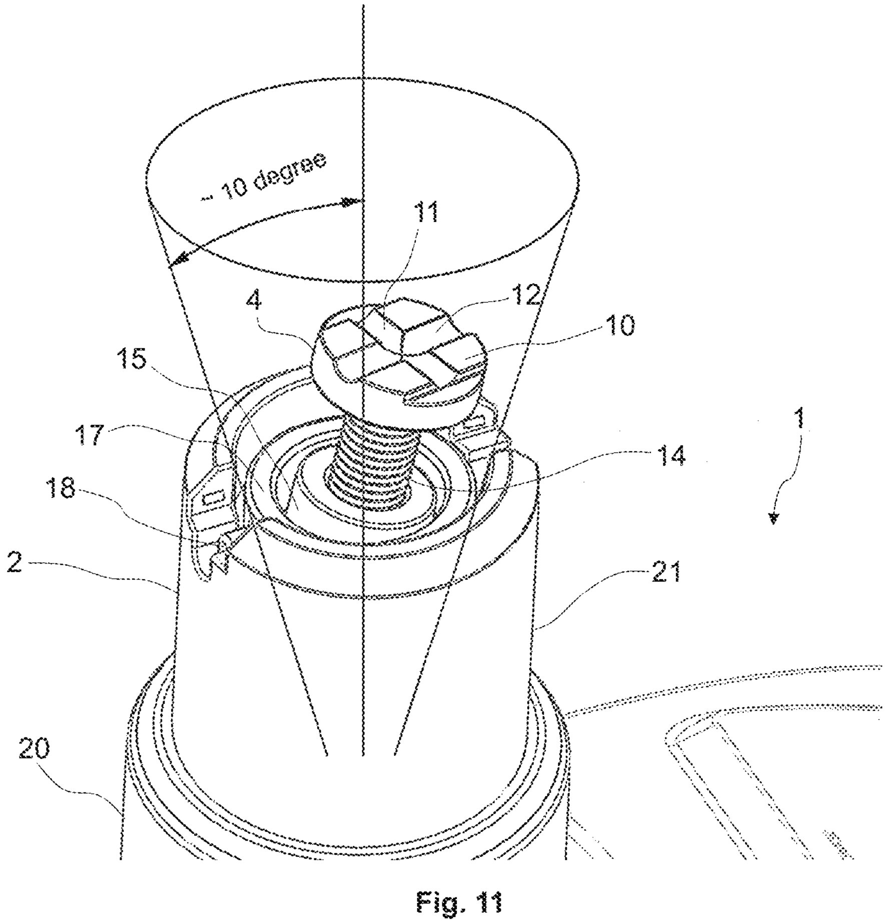
Figure 12:
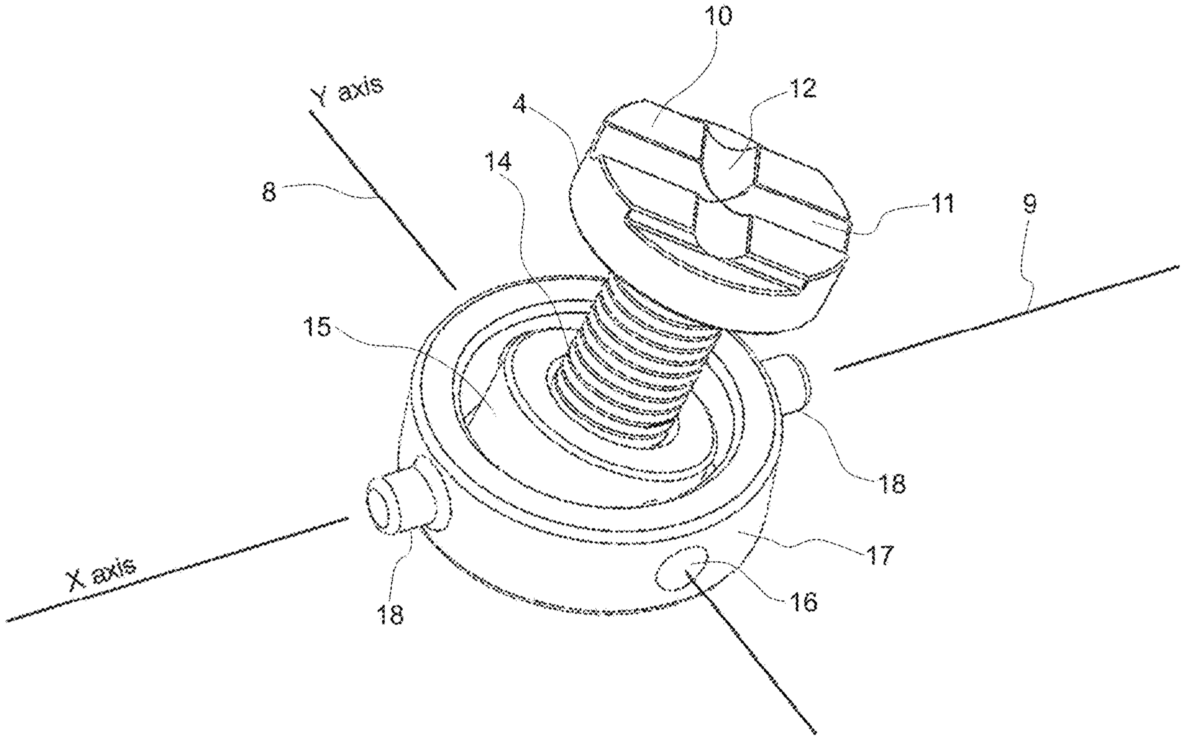
Figure 13:
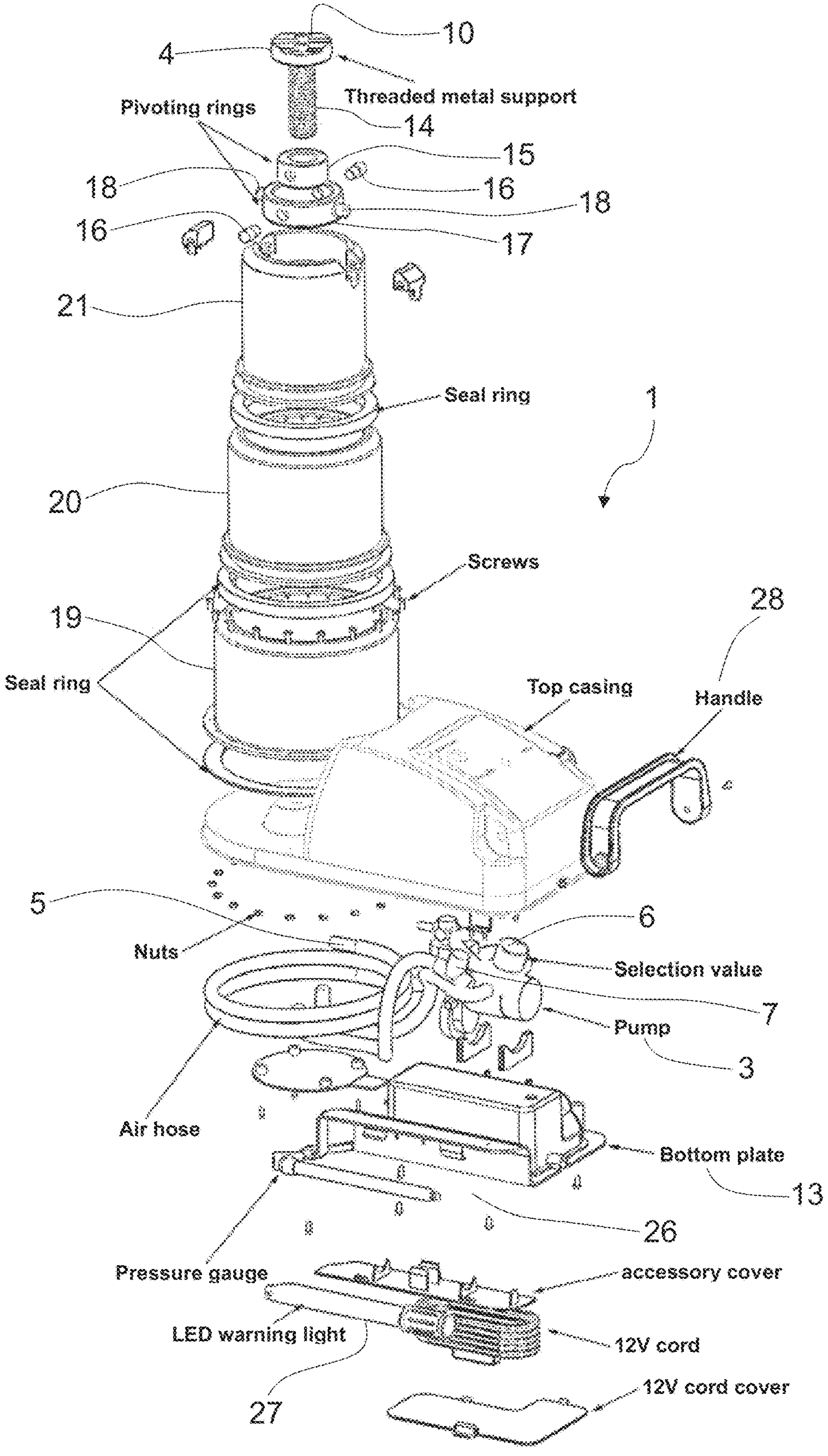
Figure 14:
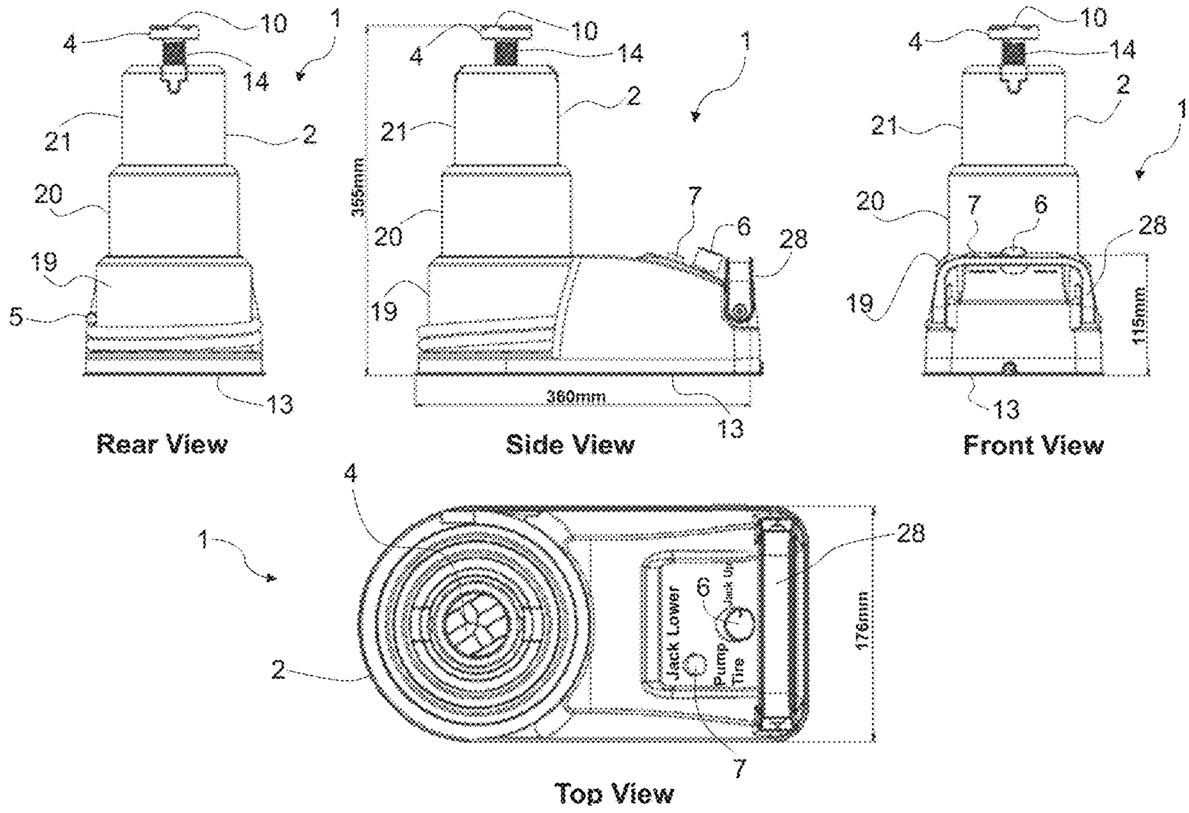
Figure 15:
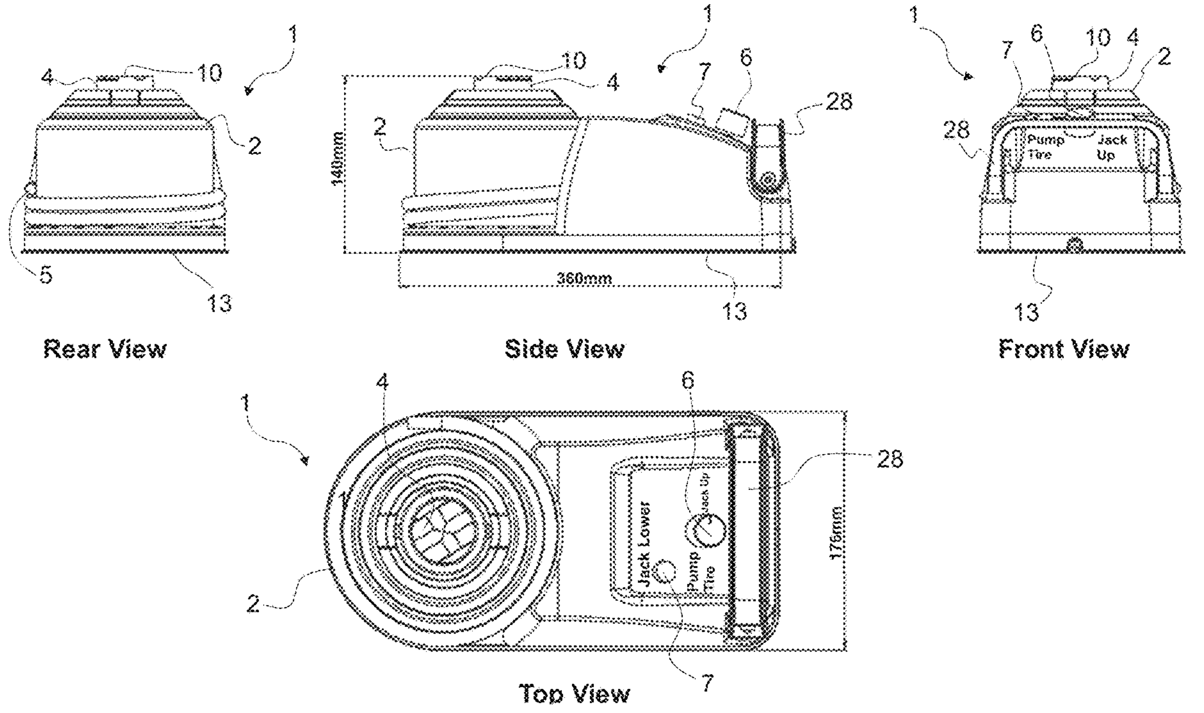

Preferred embodiments in accordance with the best mode of the present invention will now be described, by way of example only, with reference to the accompanying figures listed below, in which the same reference numerals, names, or other reference labels refer to like parts throughout the figures listed below unless otherwise specified, and in which:

FIG. 1 is a top perspective view of a pneumatic lifting device in the form of a vehicle jack in accordance with an embodiment of the present invention, depicted in a raised position;

FIG. 2 is another top perspective view of the pneumatic lifting device shown in FIG. 1, depicted in a raised position and showing some internal components;

FIG. 3 is a side perspective view of the pneumatic lifting device shown in FIG. 1, depicted in a lowered position;

FIG. 4 is a top perspective view of the pneumatic lifting device shown in FIG. 1, depicted in a lowered position and showing some internal components;

FIG. 5 is side elevation view of the pneumatic lifting device shown in FIG. 1, depicted in a raised position and showing some internal components;

FIG. 6 is another top perspective view of the pneumatic lifting device shown in FIG. 1, depicted in a lowered position and showing a cigarette lighter power adapter;

FIG. 7 is an underside perspective view of the pneumatic lifting device shown in FIG. 1, showing some internal components;

FIG. 8 is another side perspective view of the pneumatic lifting device shown in FIG. 1, depicted in a lowered position;

FIG. 9 is a cross-sectional side elevation view of the pneumatic lifting device shown in FIG. 1, showing the pneumatic cylinder and the lifting support in a raised position;

FIG. 10 comprises a side view and a cross-sectional side view of part of the pneumatic cylinder of the pneumatic lifting device shown in FIG. 1, with the cross-sectional view showing the operating surface;

FIG. 11 is a closer top perspective view of the pneumatic lifting device shown in FIG. 1, showing the lifting support;

FIG. 12 is a closer top perspective view of the lifting support of the pneumatic lifting device shown in FIG. 1;

FIG. 13 is an exploded view of the pneumatic lifting device shown in FIG. 1;

FIG. 14 comprises rear, side, front, and top views of the pneumatic lifting device shown in FIG. 1, depicted in a raised position; and FIG. 15 comprises rear, side, front, and top views of the pneumatic lifting device shown in FIG. 1, depicted in a lowered position.

MODE FOR THE INVENTION

Mode for Invention

With reference to the figures, there is provided a pneumatic lifting device 1 comprising a pneumatic cylinder 2, and a pneumatic pump 3 for providing pressurized air to the pneumatic cylinder 2. There is a support 4 for supporting an object to be lifted, the support movable between a raised position, as shown for example in FIG. 2, and a lowered position, as shown for example in FIG. 5, by the pneumatic cylinder 2. There is also a nozzle 5 for delivering pressurized air from the pneumatic pump 3.

The nozzle 5 is typically configured to fit onto a tyre valve on a tyre to deliver pressurized air from the pneumatic pump 3 to inflate the tyre.

The pneumatic lifting device 1 comprises a switch 6 for switching the pneumatic pump 3 between delivering air to the pneumatic cylinder 2 to move the support 4 and delivering air through the nozzle 5. The pneumatic lifting device 1 also comprises a switch 7 to release pressurized air from the pneumatic cylinder 2 to lower the support 4. In one example, the switch 7 opens an exhaust valve to release pressurized air from the pneumatic cylinder 2.

In some embodiments, the pneumatic lifting device 1 comprises a switch 6 for operating the pneumatic pump 3 to deliver air through the nozzle 5 whilst delivering air to the pneumatic cylinder 2, or for operating the pneumatic pump 3 to deliver air to the pneumatic cylinder 2 whilst delivering air through the nozzle 5. In other words, the pneumatic lifting device can simultaneously deliver pressurized air to the pneumatic cylinder 2 and the nozzle 5.

In some embodiments, the pneumatic lifting device 1 comprises a switch 6 for operating the pneumatic pump 3 to deliver air through the nozzle 5 whilst maintaining the support 4 at substantially the same position. In particular, the support 4 is maintained in the same raised position. For example, the support 4 can be maintained in the substantially the same position by having an operating valve that closes to maintain pressurized air inside the pneumatic cylinder 2. The operating valve can be a one-way valve that allows pressurized air to enter the pneumatic cylinder 2 but substantially prevents pressurized air from escaping thereby to maintain the support 4 in substantially the same position. In this case, the pneumatic lifting device 1 can have an exhaust valve to allow pressurized air to escape from the pneumatic cylinder 2 thereby to allow the support 4 to move to the lowered position. Instead of being a one-way valve, the operating valve can be a two-way valve that can be opened to allow pressurized air to enter the pneumatic cylinder 2, closed to substantially prevent pressurized air from escaping, and opened to allow pressurized air to escape from the pneumatic cylinder 2. The operating and exhaust valves can be operated by solenoids. In another example, the support 4 can be maintained in the same raised position with a mechanical stop that moves into place to prevent the support 4 from moving from the same raised position. The mechanical stop can then be moved out of place to allow the support 4 to move away from the same raised position.

In some embodiments, the pneumatic pump 3 can only be operated to deliver air to the pneumatic cylinder 2 exclusively, or to deliver air through the nozzle 5 exclusively. In this case, the user can only use the pneumatic lifting device 1 to deliver air through the nozzle 5 when the pneumatic lifting device is not being used for lifting an object. These embodiments simplify the construction of the pneumatic lifting device 1 since additional components for maintaining the pressure inside the pneumatic cylinder 2 whilst the pneumatic pump 3 delivers air through the nozzle 5 are not required.

The support 4 is hingeable about a first horizontal axis 8 to allow the support 4 to tilt about the first horizontal axis to compensate for tilting of the object being lifted. Preferably, the support 4 is hingeable about a second horizontal axis 9 to allow the support 4 to tilt about the second horizontal axis to compensate for tilting of the object being lifted.

In one embodiment, as best shown in FIGS. 11 and 12, the support 4 (also referred to as the lifting support) comprises a support platform 10 with two slots 11 and 12 alignable with the first 8 and second 9 horizontal axes respectively. The axes 8 and 9 are horizontal with respect to a base surface 13 of the pneumatic lifting device upon which it sits in use. The slots 11 and 12 are for retaining a portion of the object being lifted. For example, an edge of a chassis of a car can be retained in one of the slots 11 and 12 to minimise the risk of the car slipping off the support platform 10. The support platform 10 sits on a support body 14 attached to an inner collar 15. Two inner pins 16 project horizontally from the collar 15 in alignment with the first horizontal axis 8. The inner pins 16 are retained in respective holes of an outer collar 17 thereby allowing the support platform 10 to rotate about the first horizontal axis 8. There are two outer pins 18 that project horizontally from the outer collar 17 in alignment with the second horizontal axis 9. The outer pins 18 are retained in respective holes in the pneumatic cylinder 2 thereby allowing the support platform 10 to rotate about the second horizontal axis 9.

In this way, when the pneumatic cylinder 2 rises, the pneumatic cylinder 2 moves the support 4 up to the raised position, and when the pneumatic cylinder 2 lowers, the pneumatic cylinder 2 moves the support 4 down to the lowered position. As the support 4 rises and lowers, the object being lifted by the support 4 typically tilts since the object is typically lifted at one side. With the support 4 hingeable, and more particularly rotatable, about the first 8 and second 9 horizontal axes, this tilting of the object being lifted is compensated for such that the support 4 tilts with the object. In particular, the support platform 10 tilts with the tilting of the object which minimises the risk of the object slipping off the support platform 10 as the object tilts.

The hingeable support 4 also compensates for the object being located on a sloped or uneven surface. For example, if the object is a car parked on an incline whereby the front of the car is higher than the rear, the hingeable support 4 can be rotated about one or both of the first 8 and second 9 horizontal axes so that the support engages the chassis of the car in a parallel relationship thereby providing stable and robust support to the car. In particular, this stable and robust support is provided regardless of where the centre of gravity of the car has shifted due to how the car is positioned. This is particularly advantageous at the beginning of the lifting process when the pressurized air may provide a reduced lifting force.

Preferably, the support body 14 is also in threaded engagement with the inner collar 15. This provides further height adjustability and facilitates more efficient use of the pneumatic lifting device 1. For example, the support body 14 can be screwed upwards or downwards using the threaded engagement to fine-tune the height of the support 4 depending on the terrain. As another example, when in the lowered position, the pneumatic lifting device 1 can be initially placed under a vehicle. The support body 14 can then be screwed upwards whilst moving the pneumatic lifting device 1 so that the support platform 10 accurately engages the vehicle before raising the pneumatic cylinder 2 to start lifting the vehicle safely.

The pneumatic cylinder 2 comprises a plurality of sleeved sections. In the embodiment shown, the pneumatic cylinder comprises a bottom section 19, a middle section 20, and a top section 21. In the lowered position, the top section 21 is sleeved inside the middle section 20, and the middle section 20 is sleeved inside the bottom section 19. When moving to the raised position, the top section 21 slides from within the middle section 20 to above the middle section, and the middle section 20 slides from within the bottom section 19 to above the bottom section. The sections are urged into the raised position by pressurized air delivered by the pneumatic pump 3. Having sleeved sections combined with the other features of the pneumatic lifting device 1 described herein allows the pneumatic lifting device to be designed with dimensions and a form factor that is particularly advantageous as will be described in further detail below.

In particular, the pneumatic cylinder 2 has an operating surface 22 against which the pressurized air applies force to move the support 4 to the raised position. In the embodiment described above, the support 4 is attached to the top section 21 so that when it moves to the raised position, the support 4 is moved to the raised position. The operating surface 22 is the inside top surface of the top section 21. The operating surface 22 can be flat but is not necessarily flat. Where the operating surface 22 is not flat, the area of the operating surface 22 is effectively the area 23 of a flat cross-section cut parallel across the uppermost inside surface, that is, the area over which the pressurized air forces perpendicularly against the inside top surface of the top section 21 ("the effective area" 23). If the area or effective area is circular, the diameter of the operating surface 22 is the diameter 24 of the area or effective area.

Unexpectedly and surprisingly, it has been found that when using a pneumatic pump 3 that delivers pressurized air up to and including 80 to 100 psi, an operating surface 22 with an area between about 28 $cm^2$ and about 315 $cm^2$, or an operating surface 22 with a diameter between about 60 mm and about 200 mm, is optimal, including providing an optimum balance between performance, compactness, portability, and versatility for the pneumatic lifting device 1.

In particular, pneumatic pumps that are capable of 80 to 100 psi are readily available and relatively inexpensive. 80 to 100 psi is a very useful range for pumping up a wide range of tyres and tubes through the nozzle 5, including tyres and tubes used in cars and other passenger vehicles, trucks, and other vehicles, bicycles, and other everyday and domestic items. An operating surface 22 with an area between about 28 $cm^2$ and about 315 $cm^2$, or an operating surface 22 with a diameter between about 60 mm and about 200 mm provides sufficient force resulting from the pressurized air of 80 to 100 psi to lift a wide range of vehicles, including cars and other passenger vehicles and trucks. These areas and diameters for the operating surface 22 also result in an overall form factor for the pneumatic lifting device 1 that is portable and compact.

An operating surface 22 with an area between about 75 $cm^2$ and about 192 $cm^2$, or an operating surface 22 with a diameter between about 98 mm and about 156 mm has been found to be particularly advantageous since it provides sufficient force resulting from the pressurized air of 80 to 100 psi to lift a wide range of passenger vehicles, including small to large sized cars and SUVs. This category of vehicles has a particular need for a pneumatic lifting device that is portable and compact for easy storage and use whilst still providing performance and versatility. The pneumatic lifting device 1 with the characteristics and dimensions above result in a form factor having a portability and compactness well-suited for storage and use with such vehicles whilst still delivering versatility and the required performance. Embodiments of such a pneumatic lifting device 1 are able to lift the abovementioned category of vehicles from the lowered position to the raised position in about 3 to 3.5 minutes, which is well-suited to the typical circumstances of use with such vehicles.

In one particularly advantageous embodiment, the pneumatic pump 3 delivers pressurized air up to and including 100 psi. The operating surface 22 has an area of about 75 $cm^2$, or a diameter of about 98 mm. This allows the pneumatic lifting device 1 to have a minimum height of about 140 mm, that is, a height of about 140 mm in the lowered position. This minimum height has been found to be suitable for readily positioning the pneumatic lifting device 1 under vehicles for lifting. This minimum height also means the pneumatic lifting device 1 is space efficient for storage in, for example, the trunk of a vehicle. In the raised position, the support 4 is at a height of about 360 mm above the base surface 13. At this height, a typical passenger vehicle being lifted by the pneumatic lifting device 1 exhibits a tile of about 6 degrees from a plane of the base surface 13. This embodiment is particularly advantageous since it can lift an object, such as a medium sized passenger vehicle, having a mass of about 1,800 kg.

In another particularly advantageous embodiment, the pneumatic pump 3 delivers pressurized air up to and including 100 psi. The operating surface 22 has an area of about 192 $cm^2$, or a diameter of about 156 mm. This allows the pneumatic lifting device 1 to have a minimum height of about 140 mm, that is, a height of about 140 mm in the lowered position. This minimum height has been found to be suitable for readily positioning the pneumatic lifting device 1 under vehicles for lifting. This minimum height also means the pneumatic lifting device 1 is space efficient for storage in, for example, the trunk of a vehicle. In the raised position, the support 4 is at a height of about 360 mm above the base surface 13. At this height, a typical passenger vehicle being lifted by the pneumatic lifting device 1 exhibits a tile of about 6 degrees from a plane of the base surface 13. This embodiment is particularly advantageous since it can lift an object, such as a large sized passenger vehicle or SUV, having a mass of about 2,500 kg.

The pneumatic pump 3 is operable with a 12 V power supply. This allows the pneumatic pump 3 to be powered conveniently by a standard 12 V vehicle power supply. The pneumatic lifting device 1 can be supplied with a cigarette lighter socket adapter 25 to connect to a standard cigarette lighter socket socket typically provided in vehicles.

The pneumatic lifting device 1 also has a compartment 26 for storing accessories such as a safety light, tools, and tyre pressure gauges. In one embodiment, the accessory is a safety light in the form of a red LED strobe light 27 with a base in the form of a suction cup. Such a light can be attached via the suction cup to, for example, the roof of the vehicle or the lid of the trunk of the vehicle. The compactness of the pneumatic lifting device 1 resulting from the parameters above, such as the dimensions of the operating surface 22 and/or the pressure rating of the pneumatic pump 3, allows for the provision of the compartment 26, which enhances the versatility an performance of the pneumatic lifting device 1, whilst still maintaining the overall portability and compactness of the pneumatic lifting device 1. The pneumatic lifting device 1 also has a handle 28 to facilitate handling of the pneumatic lifting device 1 including facilitating placement of the pneumatic lifting device 1 underneath an object to be lifted such as a passenger vehicle.

Embodiments of the pneumatic lifting device 1 provide a synergistic combination of features particularly well-suited for storage and use with small to medium sized passenger vehicles, as well as large sized passenger vehicles and SUVs. These features include having a form factor that is portable and compact for storage and use with these vehicles whilst providing versatility and functionality that is particularly useful for such vehicles, as well as the required lifting performance. The synergistic combination of features to achieve this includes utilizing a pneumatic pump 3 that delivers up to 100 psi of pressurized air against an operating surface 22 with an area between about 75 $cm^2$ and about 192 $cm^2$, or an operating surface 22 with a diameter between about 98 mm and about 156 mm to lift a sleeved pneumatic cylinder 2. The pneumatic pump 3 is also well-suited to deliver this pressurized air through a nozzle to pump up the tyres of these vehicles, for which the pressurized air of up to 100 psi is also well-suited. These features result in a pneumatic lifting device 1 that has a height of 140 mm in a lowered position and 360 mm in a raised position which is well-suited to lifting these types of vehicles, as well as being well-suited for convenient storage in these vehicles. The synergistic combination of features also includes having a form factor that includes a storage compartment 26 for storing accessories such as a safety light, tools, and tyre pressure gauges, which are particularly useful with these vehicles and the situations encountered with these vehicles.

It is appreciated that the aforesaid embodiments are only exemplary embodiments adopted to describe the principles of the present invention, and the present invention is not merely limited thereto. Various variants and modifications can be made by those of ordinary skill in the art without departing from the spirit and essence of the present invention, and these variants and modifications are also covered within the scope of the present invention. Accordingly, although the invention has been described with reference to specific examples, it is appreciated by those skilled in the art that the invention can be embodied in many other forms. It is also appreciated by those skilled in the art that the features of the various examples described can be combined in other combinations.

The invention claimed is:

1. A pneumatic lifting device comprising:

a pneumatic cylinder;

a pneumatic pump for providing pressurized air to the pneumatic cylinder;

a support for supporting an object to be lifted, the support movable between a raised position and a lowered position by the pneumatic cylinder, wherein the support is hinged about a first horizontal axis to allow the support to tilt about the first horizontal axis to compensate for tilting of the object being lifted, and wherein the support is hinged about a second horizontal axis to allow the support to tilt about the second horizontal axis to compensate for tilting of the object being lifted; and a nozzle for delivering pressurized air from the pneumatic pump.

2. The pneumatic lifting device according to claim 1 comprising a switch for switching the pneumatic pump between delivering air to the pneumatic cylinder to move the support and delivering air through the nozzle.

3. The pneumatic lifting device according to claim 1 comprising a switch for operating the pneumatic pump to deliver air through the nozzle whilst delivering air to the pneumatic cylinder, or for operating the pneumatic pump to deliver air to the pneumatic cylinder whilst delivering air through the nozzle.

4. The pneumatic lifting device according to claim 1 comprising a switch for operating the pneumatic pump to deliver air through the nozzle whilst maintaining the support at substantially the same position.

5. The pneumatic lifting device according to claim 1 comprising a switch to release pressurized air from the pneumatic cylinder to lower the support.

6. The pneumatic lifting device according to claim 1 wherein the pneumatic pump is operable with a 12 V power supply.

7. The pneumatic lifting device according to claim 1 wherein the pneumatic lifting device has a minimum height of 140 mm.

8. The pneumatic lifting device according to claim 1 wherein the pneumatic pump delivers pressurized air up to and including 100 psi.

9. The pneumatic lifting device according to claim 1 wherein the pneumatic cylinder has an operating surface against which the pressurized air applies force to move the support to the raised position.

10. The pneumatic lifting device according to claim 9 wherein the operating surface has a diameter between about 60 mm and about 200 mm.

11. The pneumatic lifting device according to claim 9 wherein the operating surface has a diameter between about 98 mm and about 156 mm.

12. The pneumatic lifting device according to claim 9 wherein the operating surface has a diameter of about 98 mm.

13. The pneumatic lifting device according to claim 9 wherein the operating surface has an area between about 28 cm2 and about 315 cm2.

14. The pneumatic lifting device according to claim 9 wherein the operating surface has an area between about 75 cm2 and about 192 cm2.

15. The pneumatic lifting device according to claim 9 wherein the operating surface has an area of about 75 cm2.

* * * * *